United States Patent
Chiang (10) Patent No.: US 6,819,508 B2
(45) Date of Patent: Nov. 16, 2004

(54) INSERTION TYPE LENS ASSEMBLY FOR AN OPTICAL SYSTEM

(75) Inventor: Ching-Fa Chiang, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 12 days.

(21) Appl. No.: 10/335,648

(22) Filed: Dec. 30, 2002

(65) Prior Publication Data

US 2004/0125470 A1 Jul. 1, 2004

(51) Int. Cl.[7] ............................. G02B 9/34; G02B 7/02
(52) U.S. Cl. ...................... 359/796; 359/811; 359/819
(58) Field of Search ................................ 359/796, 797, 359/801, 808, 811, 819, 829, 830

(56) References Cited

U.S. PATENT DOCUMENTS

| | | | | |
|---|---|---|---|---|
| 4,488,776 A | * | 12/1984 | Skinner | 359/808 |
| 4,662,717 A | * | 5/1987 | Yamada et al. | 359/811 |
| 4,886,342 A | * | 12/1989 | Kudo et al. | 359/819 |
| 5,428,480 A | * | 6/1995 | Betensky | 359/708 |
| 5,570,237 A | * | 10/1996 | Sato | 359/797 |
| 2002/0030899 A1 | * | 3/2002 | Maeda et al. | 359/811 |
| 2003/0081331 A1 | * | 5/2003 | Abe | 359/796 |
| 2003/0223130 A1 | * | 12/2003 | Huang | 359/796 |

* cited by examiner

*Primary Examiner*—Georgia Epps
*Assistant Examiner*—Alicia M. Harrington
(74) *Attorney, Agent, or Firm*—Charles E. Baxley (57) ABSTRACT

An insertion type lens assembly for an optical system which connects a plastic lens and a plastic lens, a plastic lens and a glass lens, or a plastic lens and a barrel. A separation mold surface is located different sides, and a spacer is located between the lenses. The concentric contact plane is located at the inner periphery of the lens core or the sleeve. The vertical contact plane is located at the inner periphery of the lens core or the machining surface of the sleeve. Such that the present invention can avoid hairs on the separation mold surface and increases the precision of the shape of the surface of insert.

9 Claims, 17 Drawing Sheets

INSERTION TYPE LENS ASSEMBLY FOR AN OPTICAL SYSTEM

FIELD OF THE INVENTION

The present invention relates to a lens assembly for an optical system and more particularly, to a lens assembly that connects a plastic lens to a plastic lens, a plastic lens to a glass lens, or a plastic lens to a barrel. A separation mold surface is set at different sides (outer sides, inner sides or an outer side and an inner side), and a spacer is located between the lenses.

BACKGROUND OF THE INVENTION

Figure 1:
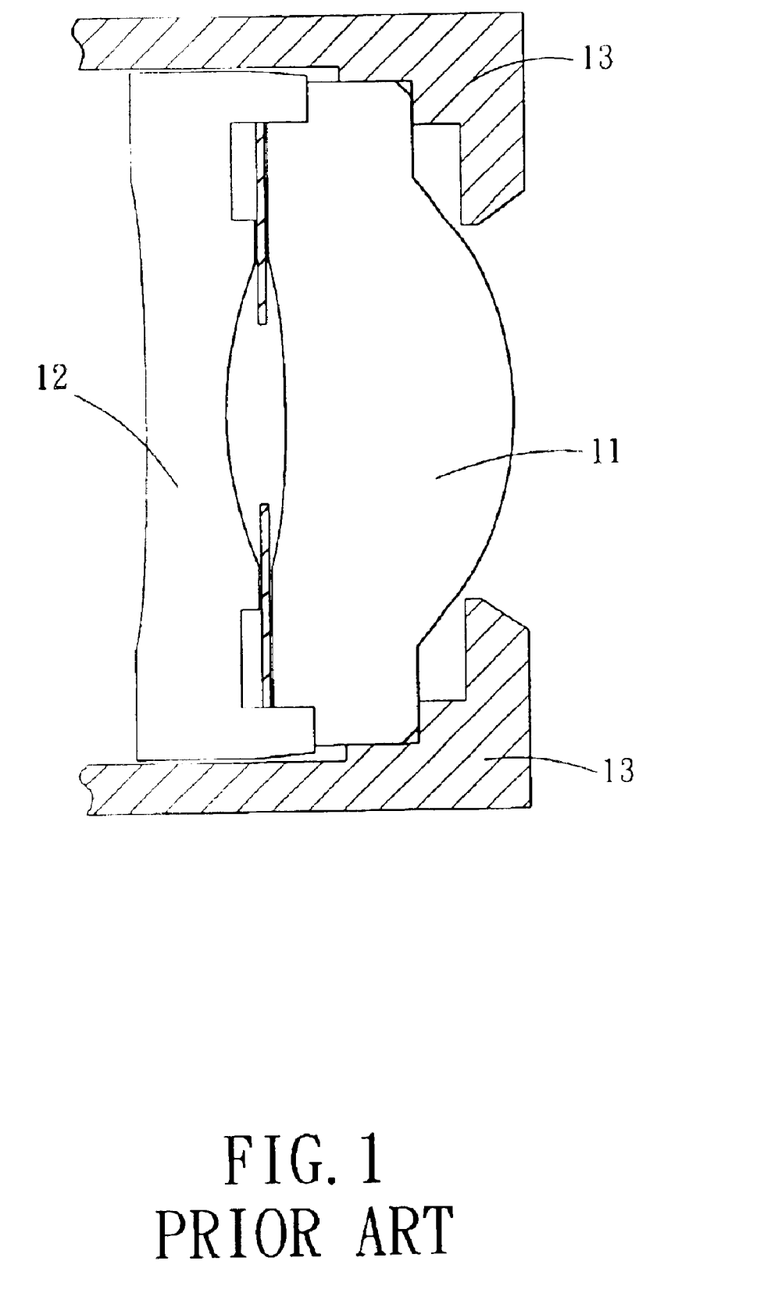
FIG. 1 shows a conventional lens assembly.

How to reduce factors of reducing the optical resolution and the precision of axial installation is the main issue of the present optical industry. In an optical system, a method of connecting two lenses together is shown in FIG. 1.

A first lens 11 and a second lens 12 are connected with each other by the flat surfaces and their outer periphery are engaged with the barrel 13. The axis of the first lens 11 and the axis of the second lens 12 can be located in alignment with each other when installing the lenses in the barrel by checking the degree of perpendicularity for the flat surfaces to the axes of the first and the second lenses 11, 12, the degree of alignment of the axis of the barrel 13 to the outer peripheries of the first and the second lenses 11, 12, the gap between the barrel 13 and the first and the second lenses 11, 12, and the relative degree of alignment of the contact positions of the barrel 13 and the two lenses 11, 12.

Figure 2:
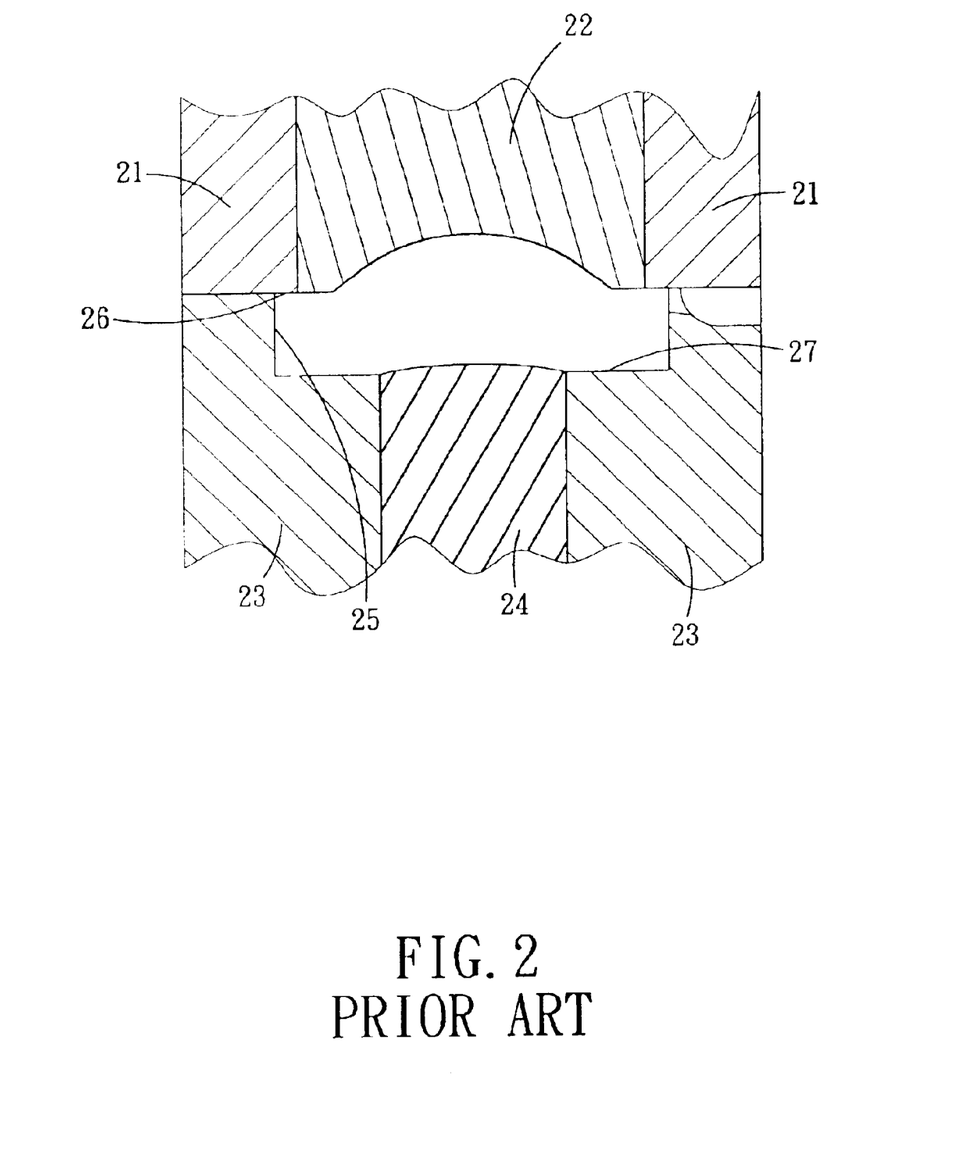
FIG. 2 shows a conventional lens mold.

However, when the first and the second lenses 11, 12 includes a plastic lens, there will be some problems when manufacturing. A typical plastic lens is shown in FIG. 2 and consist of four parts in a mold, cavity side sleeve 21, cavity 22, core side sleeve 23 and core 24. Generally, the concentric contact plane is designated to the position 25 and the vertical contact plane is designated to the position 26 or position 27. This arrangement usually leads to some problems.

Figure 3:
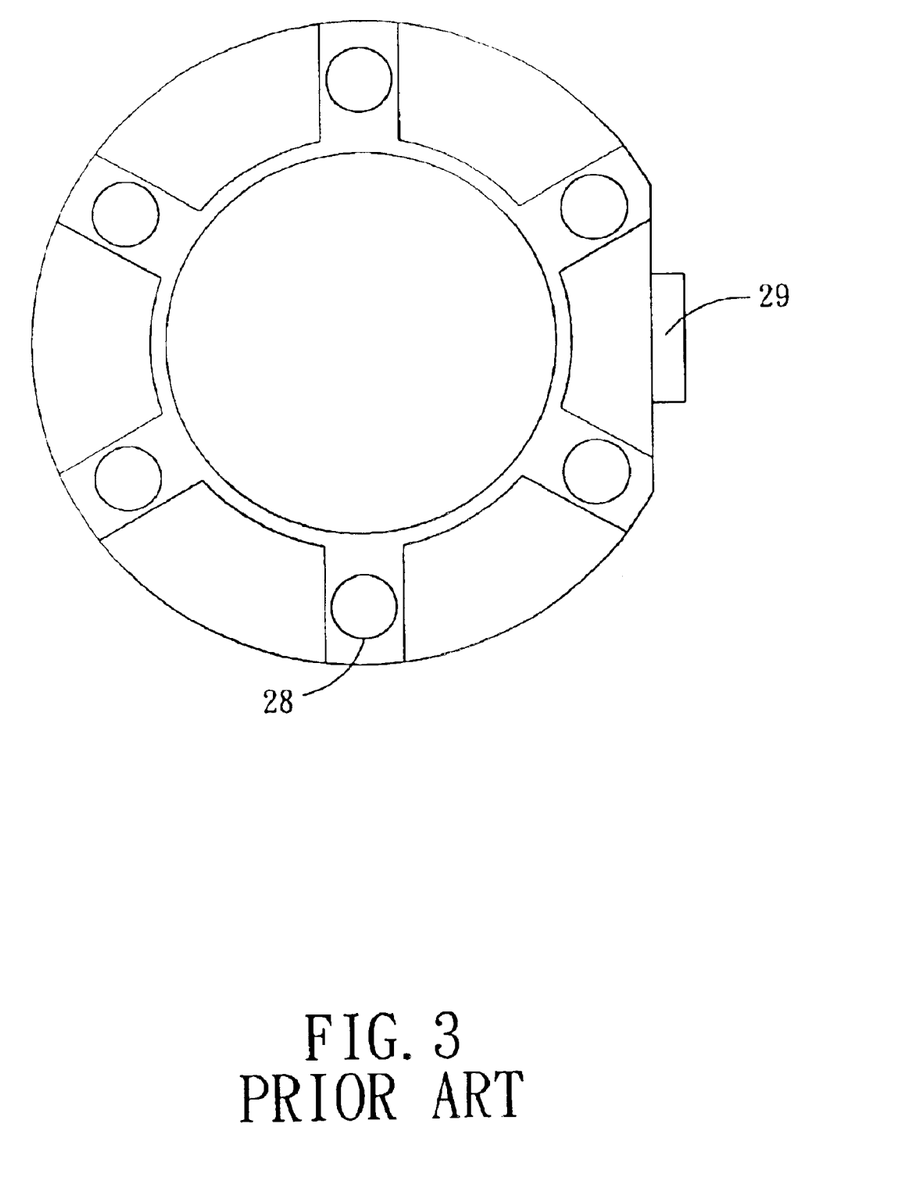
FIG. 3 shows D-cutout of the conventional lens mold.

First, the precise of the shape of the product depends upon the mold and the cavity 22 and the core 24 are machined by two-axle precise lathe which has a precision to 0.1 um and the inner periphery of the barrel is made by way of grinding which has a precision to 1 um. If the positions 25, 26, 27 of the lens are pushed by the molds and if the gate is allowed to be protruded, then the lens can be made by lathe which has a precision up to 2–5 um as shown in FIG. 3. If the positions are pushed by ejection pins 28 and D-shaped cut 29, then electric discharge machining is used which has a precision up to 20 um. Therefore, the optical axes is not easily to be put in alignment with each other.

SUMMARY OF THE INVENTION

The primary object of the present invention is to provide a lens assembly of an optical system and which can avoid the difference of optical axes between the outer periphery of lenses and barrel by way of connection between the lenses or between a spacer and a lens. This can increase resolution of the optical system.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 4:
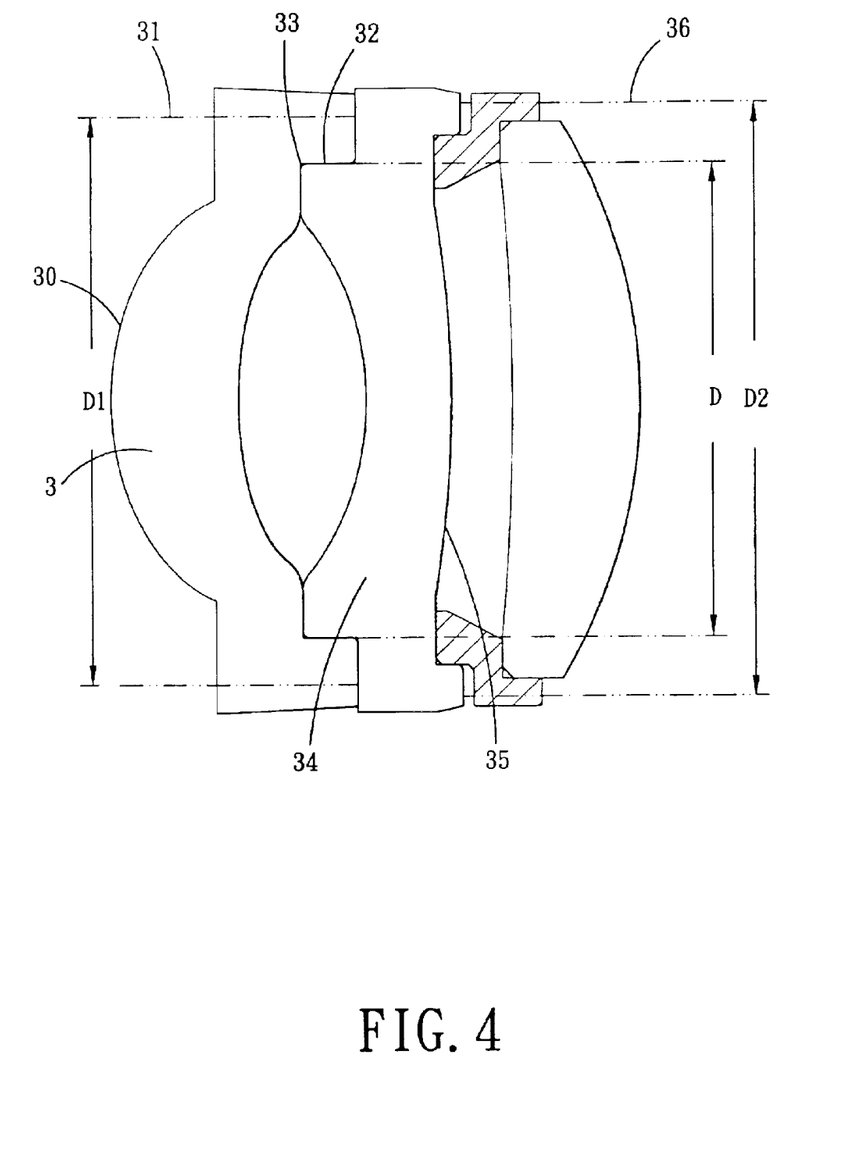
FIGS. 4 to 17 show the first embodiment to the fourteenth embodiment of the present invention.

Referring to FIG. 4, in the first embodiment, two plastic lenses are connected with each other and a flat surface and co-axial surface of insert for controlling the distance between the lenses are involved in the side of the connection. The lens core 30 of the first lens 3 and the parting line of sleeve 31 are located at an outer side of the surface of insert 32. The diameter D1 of the parting line of sleeve 31 and the lens core 30 are larger than the diameter D of the spacer 33. The core lens 35 of the second lens 34 and the side of insert 36 are located at an outer side of the surface of insert 32. The diameter D2 of the side of insert 36 is larger than the diameter D of the spacer 33. The surface of insert 32 of the first lens 3 and the second lens 34 contact directly. The parting line of sleeve 31, side of insert 36 of the first lens 3 and the second lens 34 are located at an outer side of the surface of insert 32 so that hairs on the periphery of the parting line of sleeve 31, side of insert 36 of the first lens 3 and the second lens 34 can be avoided, and the precision of the shape of the surface of insert can be increased.

Figure 5:
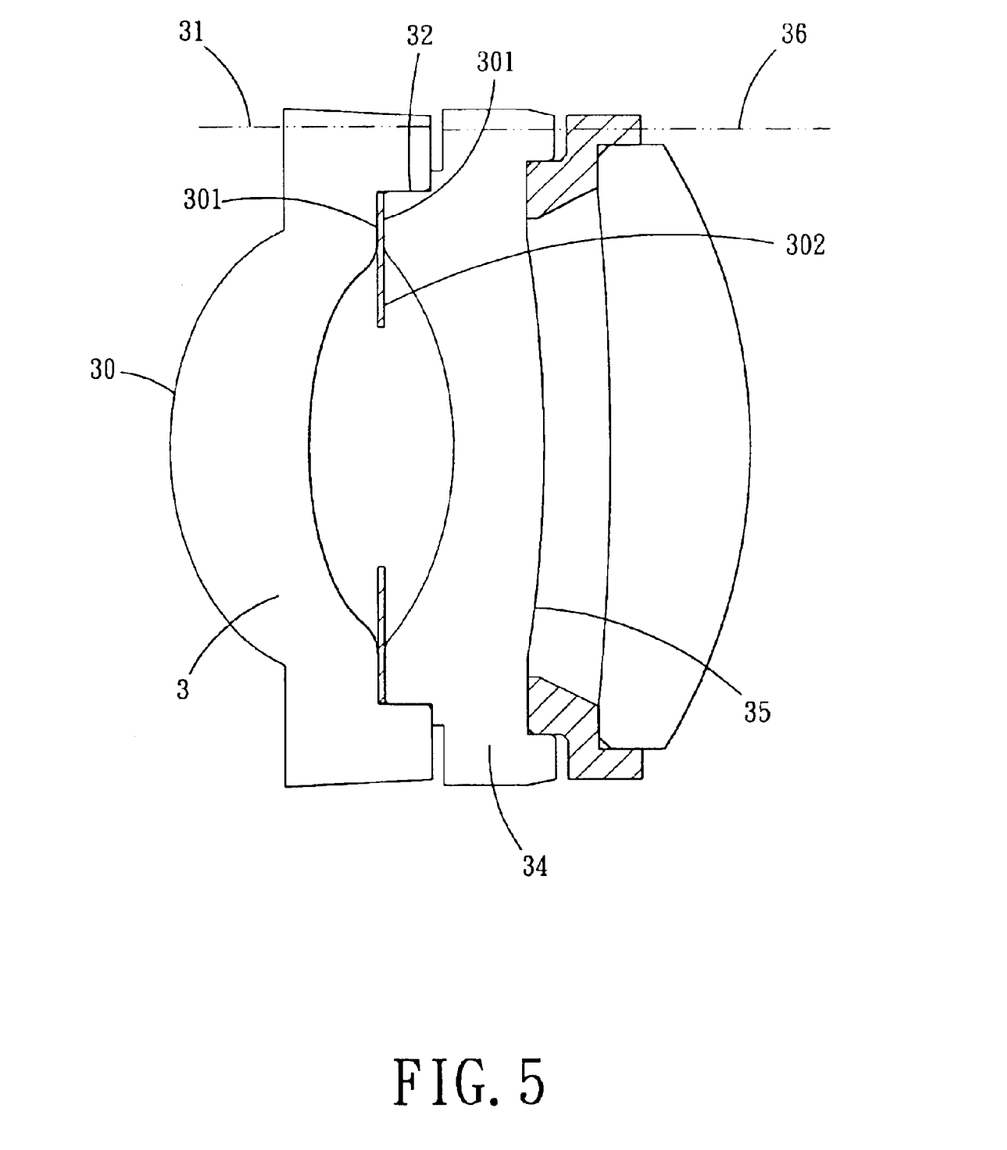

In the second embodiment, as shown in FIG. 5, the lens core 30 of the first lens 3 and the parting line of sleeve 31 are located at an outer side of the surface of insert 32. The core lens 35 of the second lens 34 and the side of insert 36 are located at an outer side of the surface of insert 32. The surface 301 for controlling the distance between the first lens 3 and the second lens 34 is separated by a spacer 302 which can be a SOMA to control the incoming light to obtain a good quality of image. The thickness of the spacer 302 is less than 0.25 mm.

Figure 6:
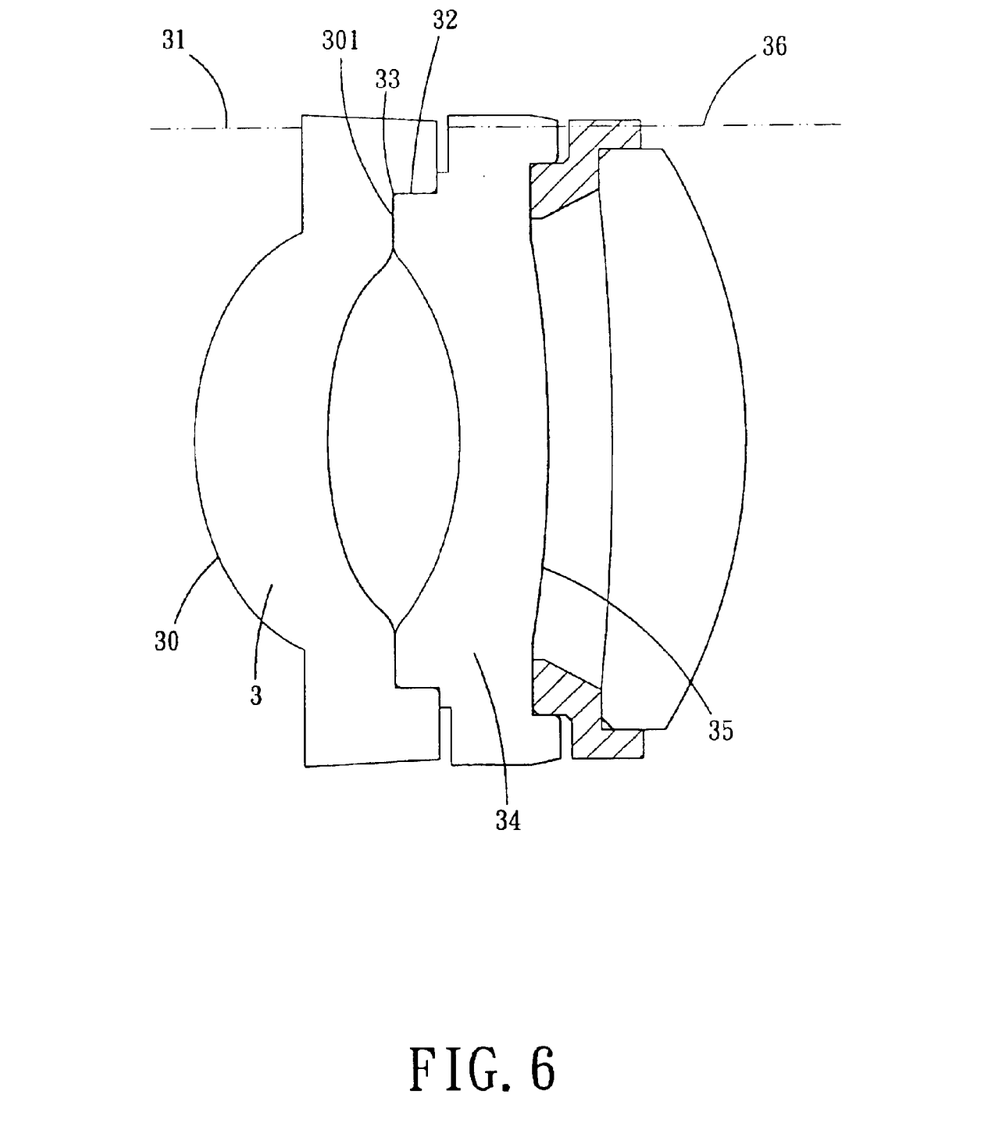

In the third embodiment, as shown in FIG. 6, the lens core 30 of the first lens 3 and the parting line of sleeve 31 are located at an inside of the surface 301 for controlling the distance between the lenses. The core lens 35 of the second lens 34 and the side of insert 36 are located at an outer side of the surface of insert 32. Hairs on the periphery of the parting line of sleeves 31, side of insert 36 of the first lens 3 and the second lens 34 can be avoided and the assembly can be made in a stable manner.

Figure 7:
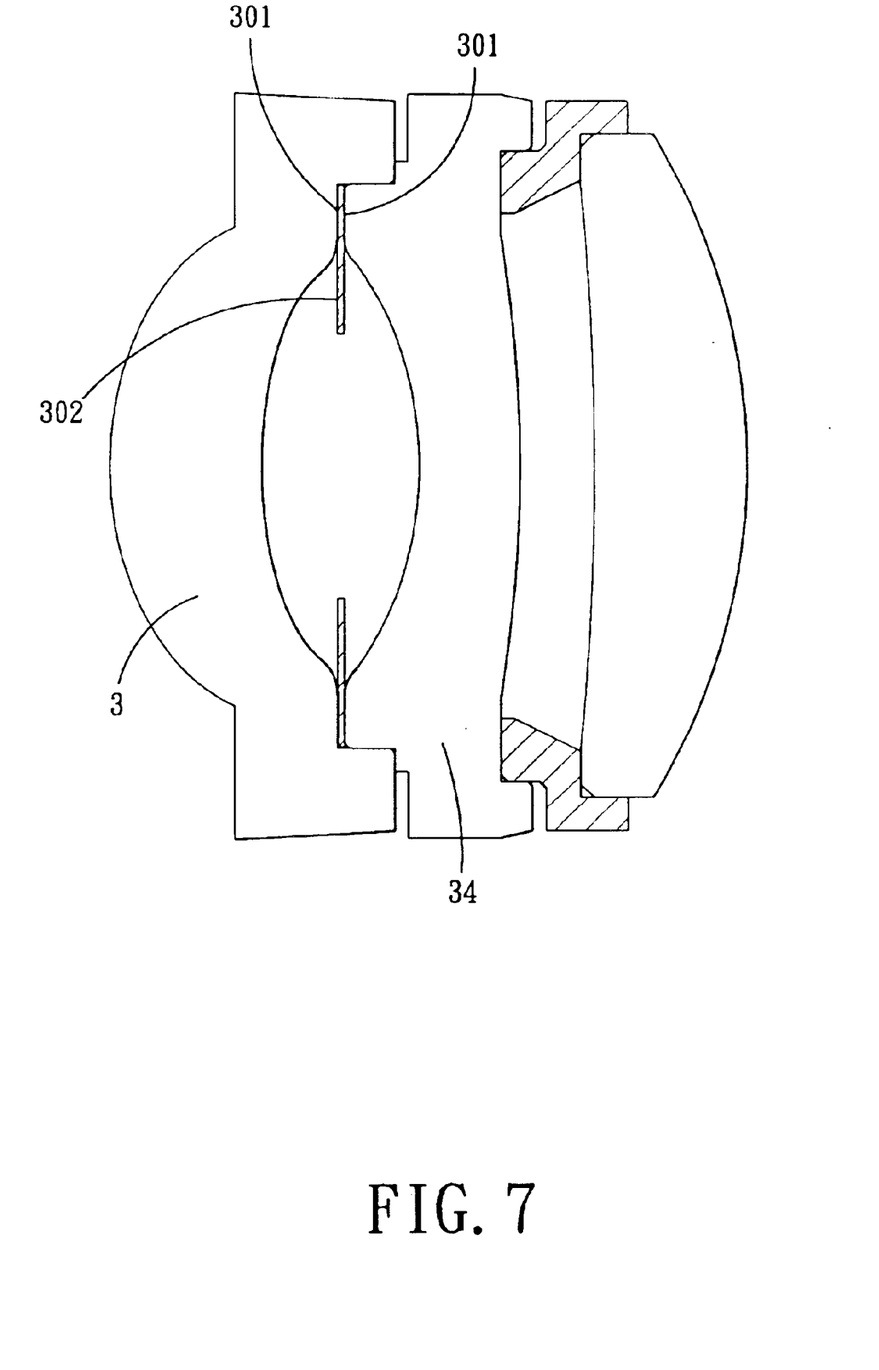

In the fourth embodiment as shown in FIG. 7, similar to that of the third embodiment, the surface 301 for controlling the distance between the first lens 3 and the second lens 34 is separated by a spacer 302 and the thickness of the spacer 302 is less than 0.25 mm.

Figure 8:
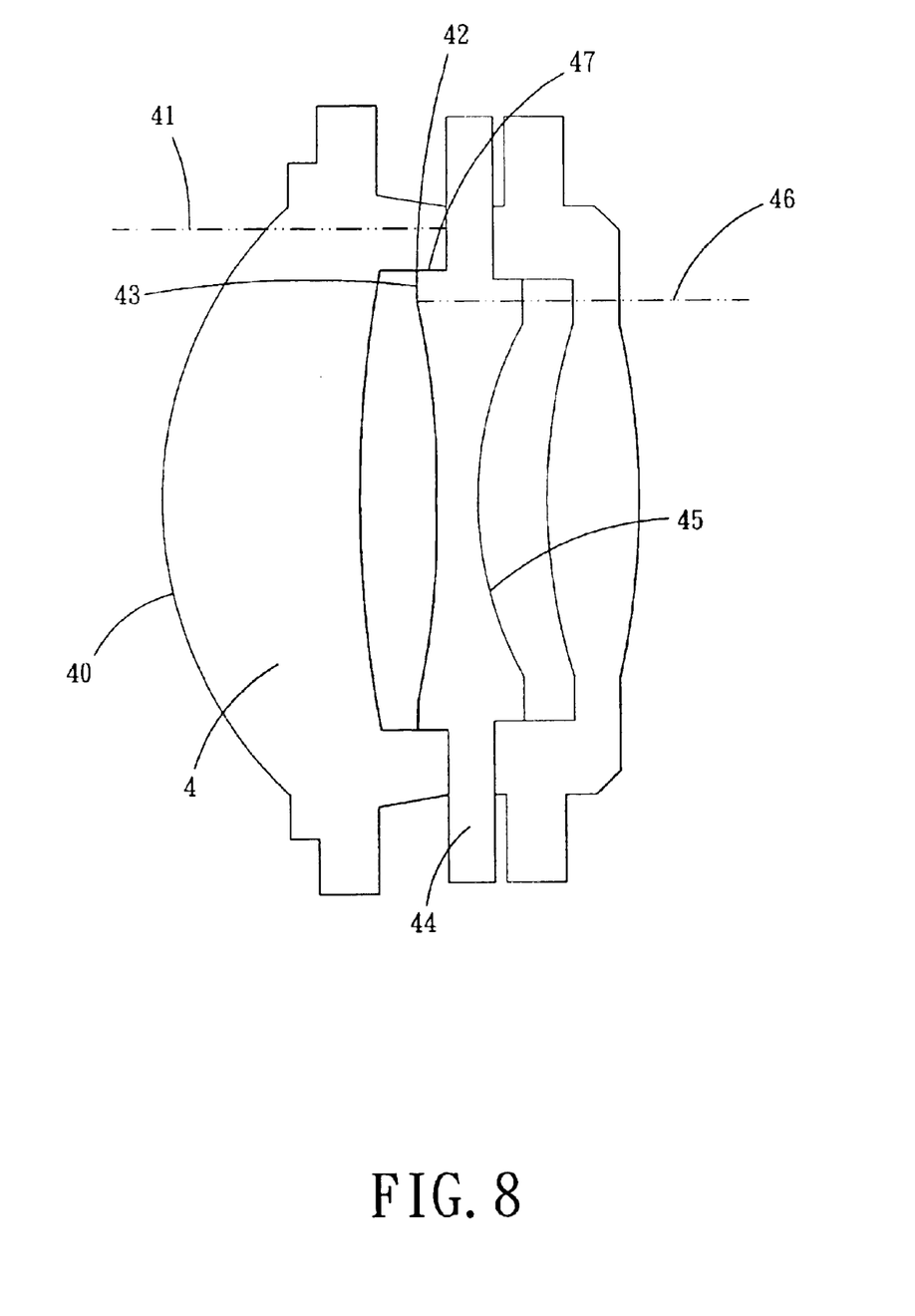

In the fifth embodiment as shown in FIG. 8, the lens core 40 of the first lens 4 and the parting line of sleeve 41 are located on the surface 43 for controlling the distance between the lenses of the side of insert 42. The lens core 45 of the second lens 44 and the parting line of sleeve 46 are located at the inner side of the side of insert 42.

Figure 9:
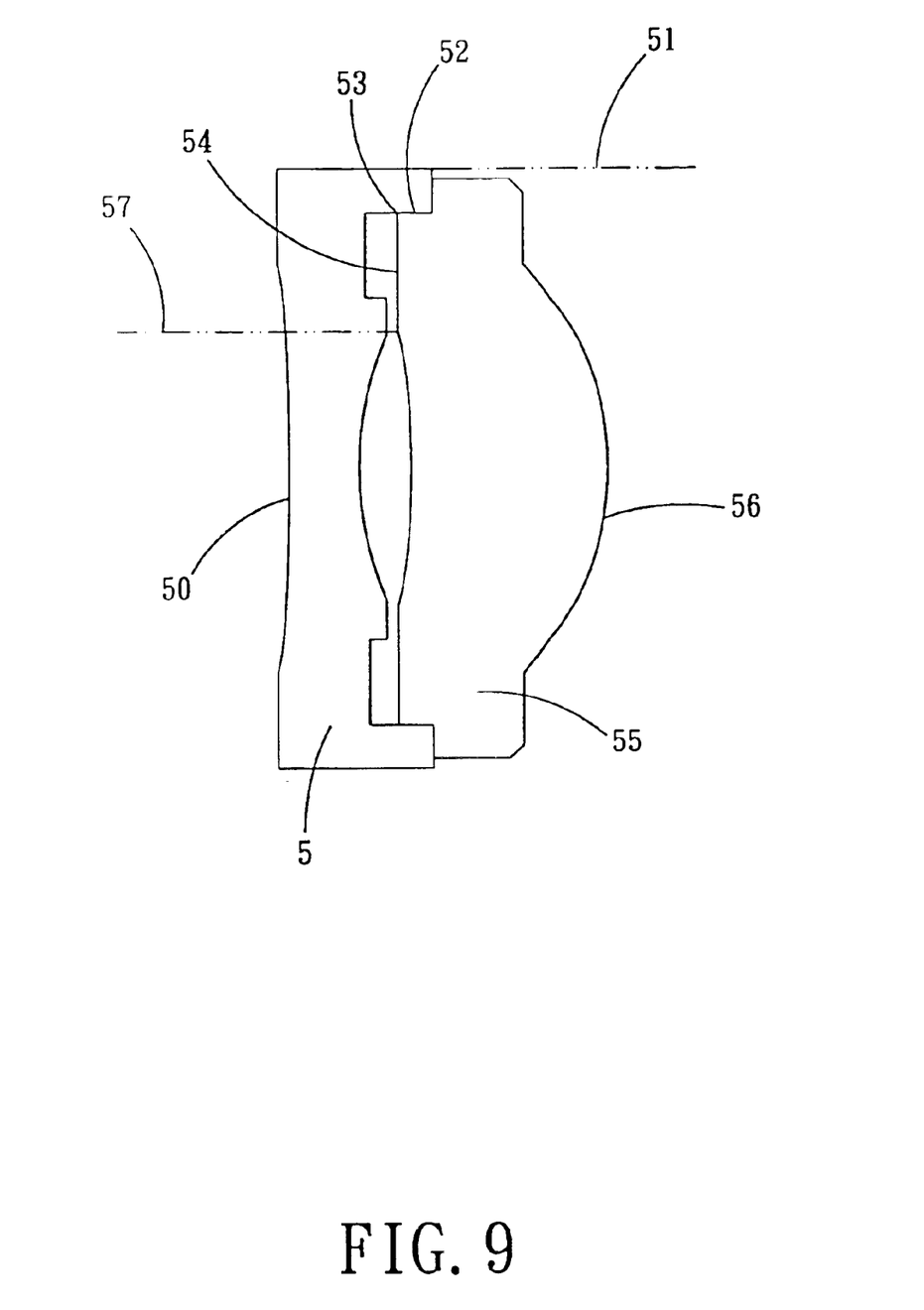

In the sixth embodiment as shown in FIG. 9, the lens core 50 of the first lens 5 and the parting line of sleeve 51 are located at an outer side of the surface 54 for controlling the distance between the lenses of the side of insert 53 and the surface of insert 52. The lens core 56 of the second lens 55 and the parting line of sleeve 57 are located at an inner side of the surface of insert 52.

Figure 10:
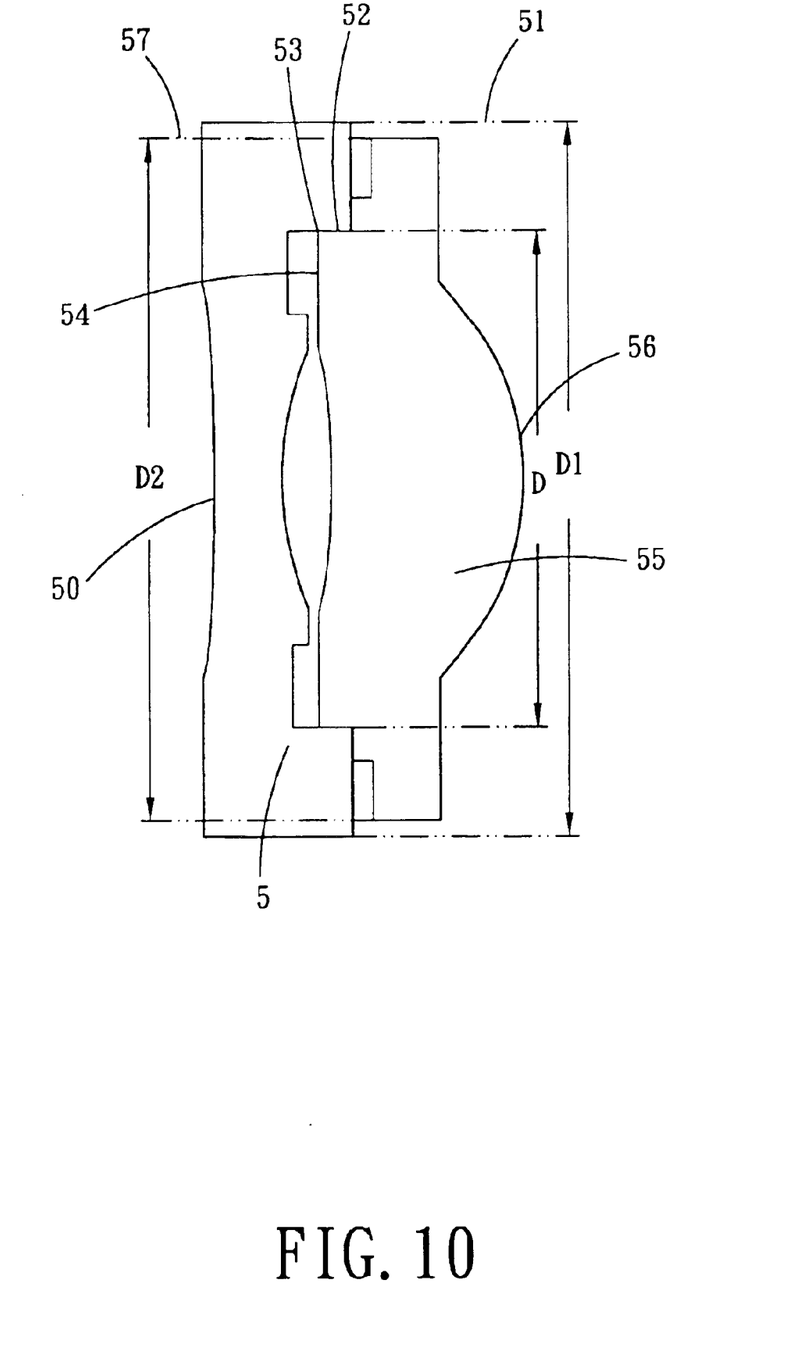

In the seventh embodiment as shown in FIG. 10, the lens cores 50, 56 of the first lens 5 and the second lens 55 and the parting line of sleeves 51, 57 are located at an outer side of the surface 54 for controlling the distance between the lenses of the side of insert 53 and the surface of insert 52. The diameter D1 of the parting line of sleeve 51 and the lens core 50 of the first lens 5 are larger than the diameter D of the side of insert 53. The diameter D2 of the parting line of sleeve 57 of the second lens 55 is larger than the diameter D of the side of insert 53.

Figure 11:
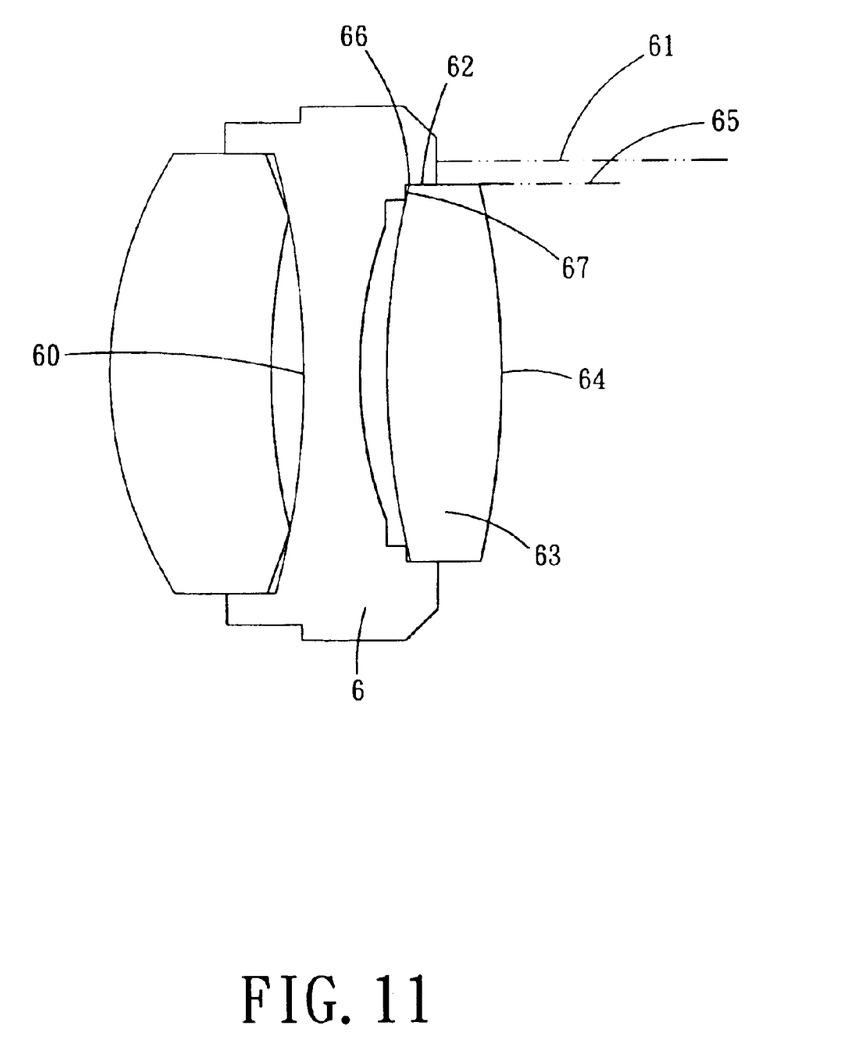

In the eighth embodiment as shown in FIG. 11, the lens core 60 of the first lens 6 and the parting line of sleeve 61 are located at an outer side of the surface 62. The lens core 64 of the second lens 63 and the parting line of sleeve 65 are located at a horizontal inner side of the surface 67 for controlling the distance between lenses of the side of insert 66.

Figure 12:
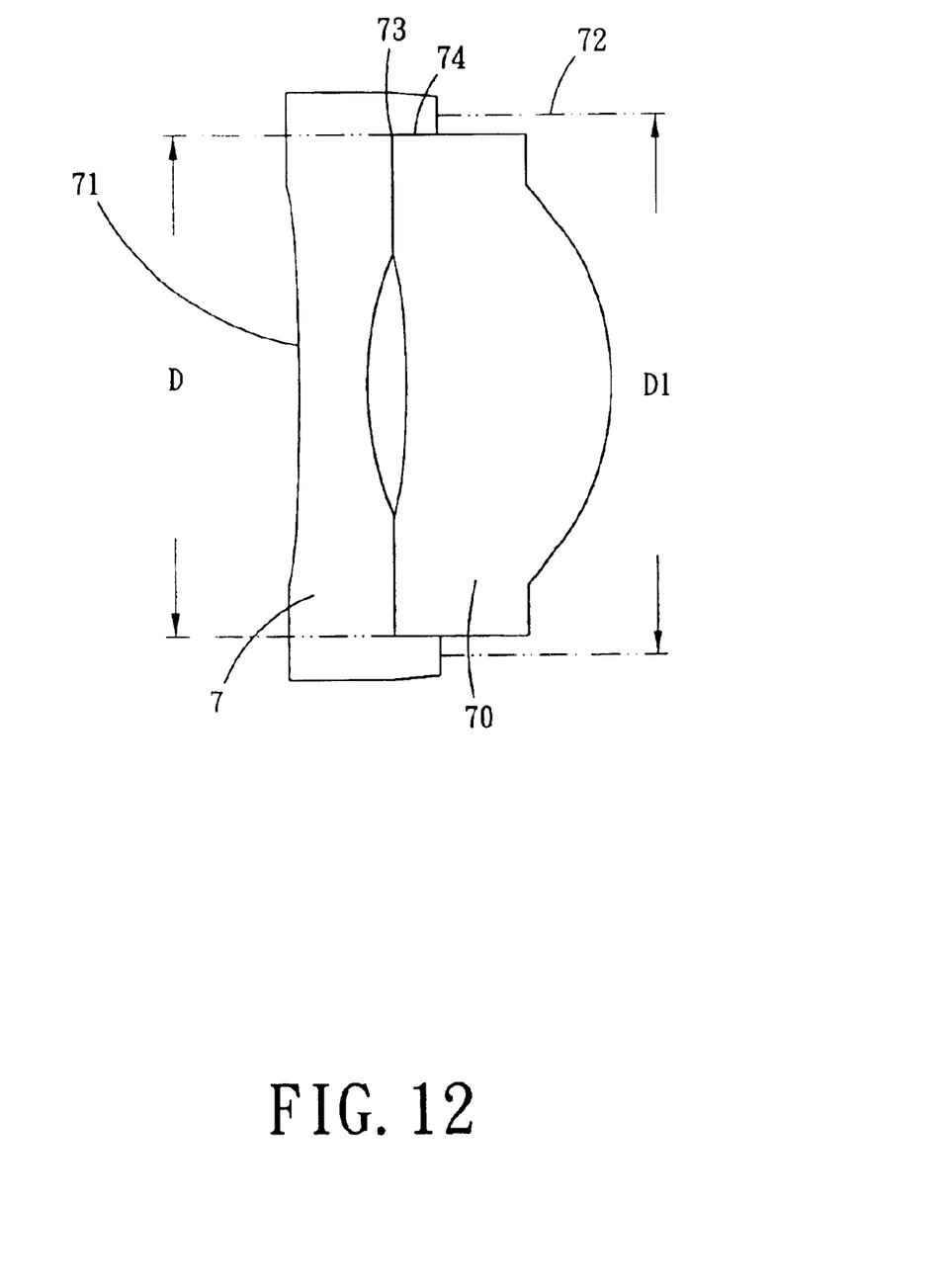

In the ninth embodiment as shown in FIG. 12, the first lens 7 can be a plastic lens and the second lens 70 can be a glass lens which is connected to the first lens. The lens core 71 of the first lens 7 and the parting line of sleeve 72 are located at an outer side of the side of insert 73. The diameter D1 of the parting line of sleeve 72 and lens core 71 of the first lens 7 are larger than the diameter D of the side of insert 73. The surface of insert 74 of the first lens 7 and the second lens 70 may contact directly.

Figure 13:
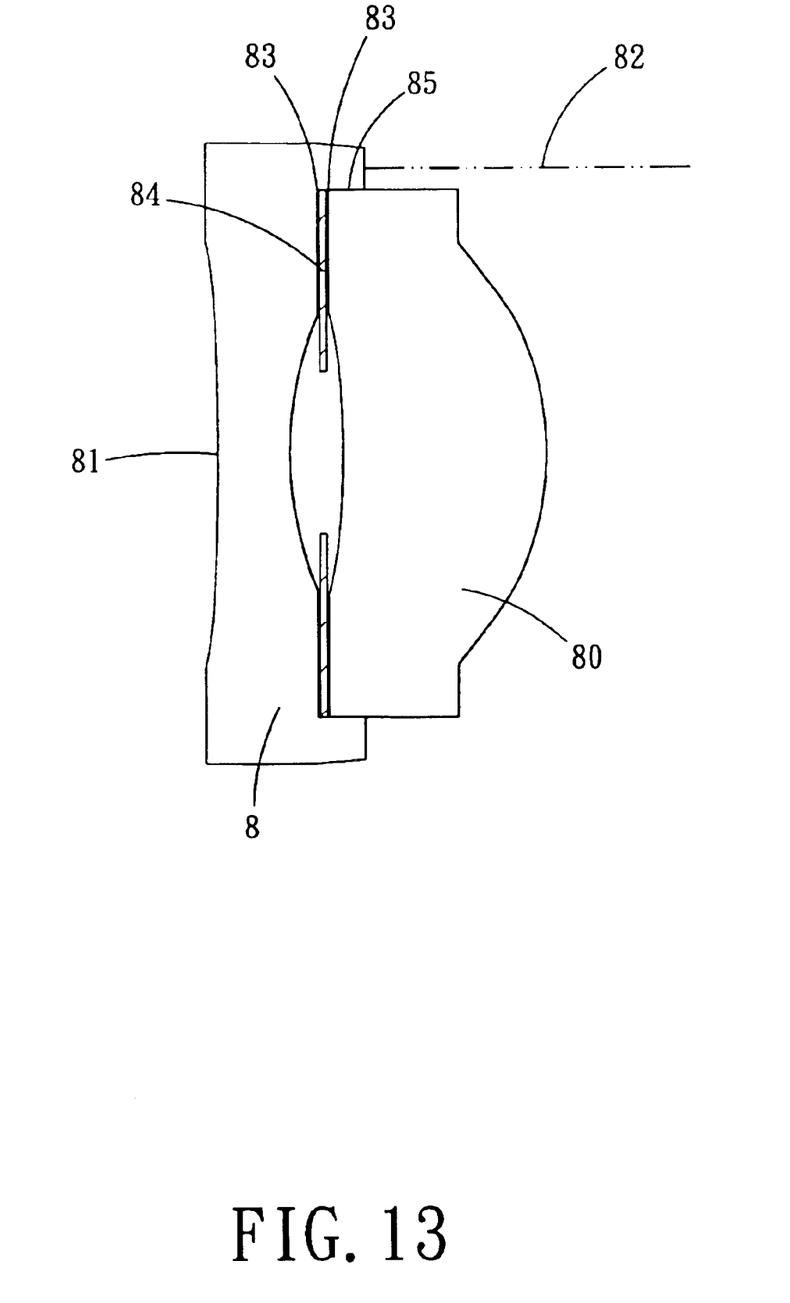

In the tenth embodiment as shown in FIG. 13, the first lens 8 is a plastic lens and the second lens 80 can be a glass lens which is connected to the first lens. The lens core 81 of the first lens 8 and the parting line of sleeve 82 are located at an outer side of the side of insert 83. A spacer 84 is located between the side of inserts 83 to separate the first lens 8 and the second lens 80, the thickness of the spacer 84 is less than 0.25 mm.

Figure 14:
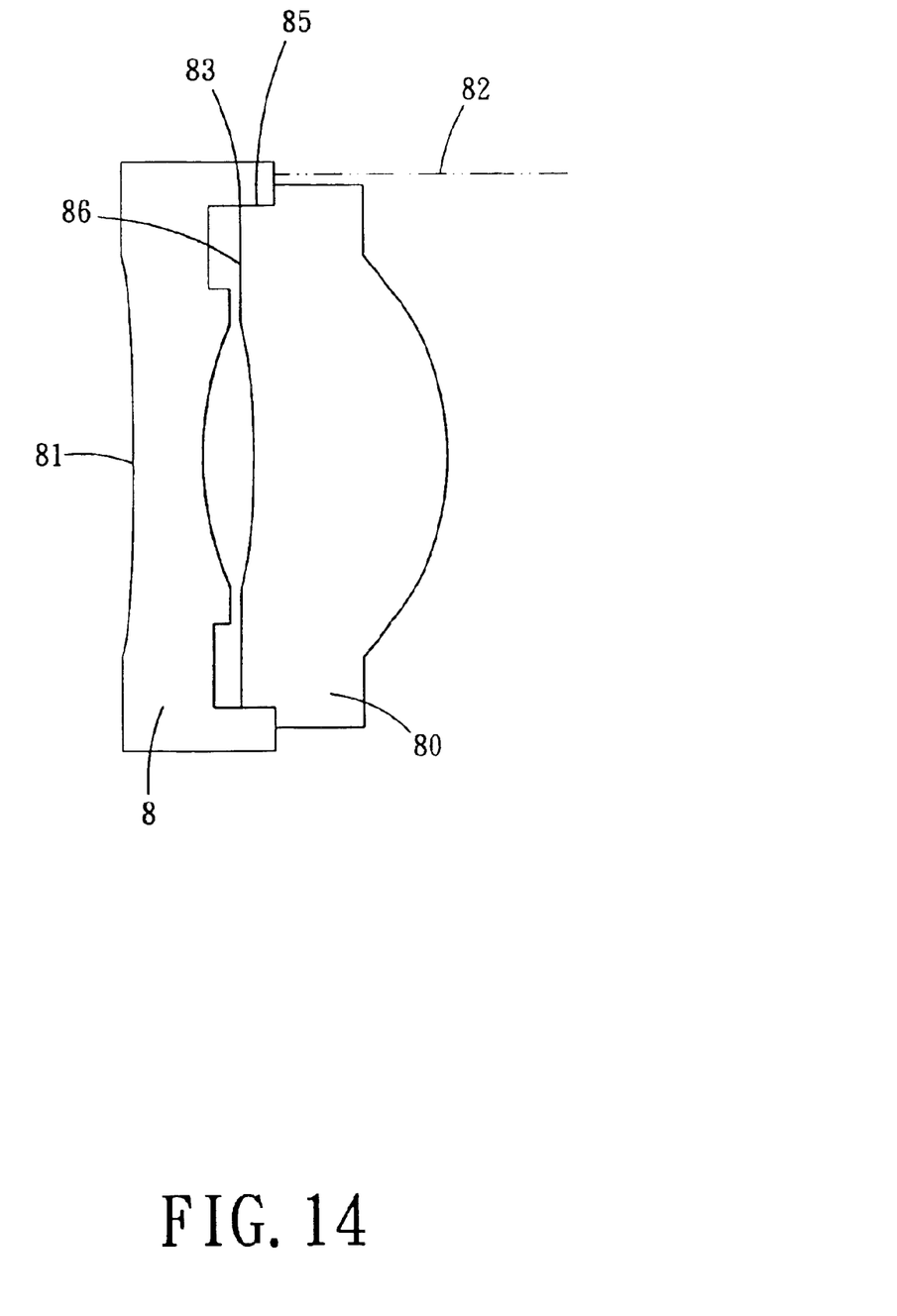

In the eleventh embodiment as shown in FIG. 14, the first lens 8 is a plastic lens and the second lens 80 can be a glass lens. The lens core 81 of the first lens 8 and the parting line of sleeve 82 are located on the surface 86 for controlling the distance between the two lenses of the surface of insert 85 and the side of insert 83.

Figure 15:
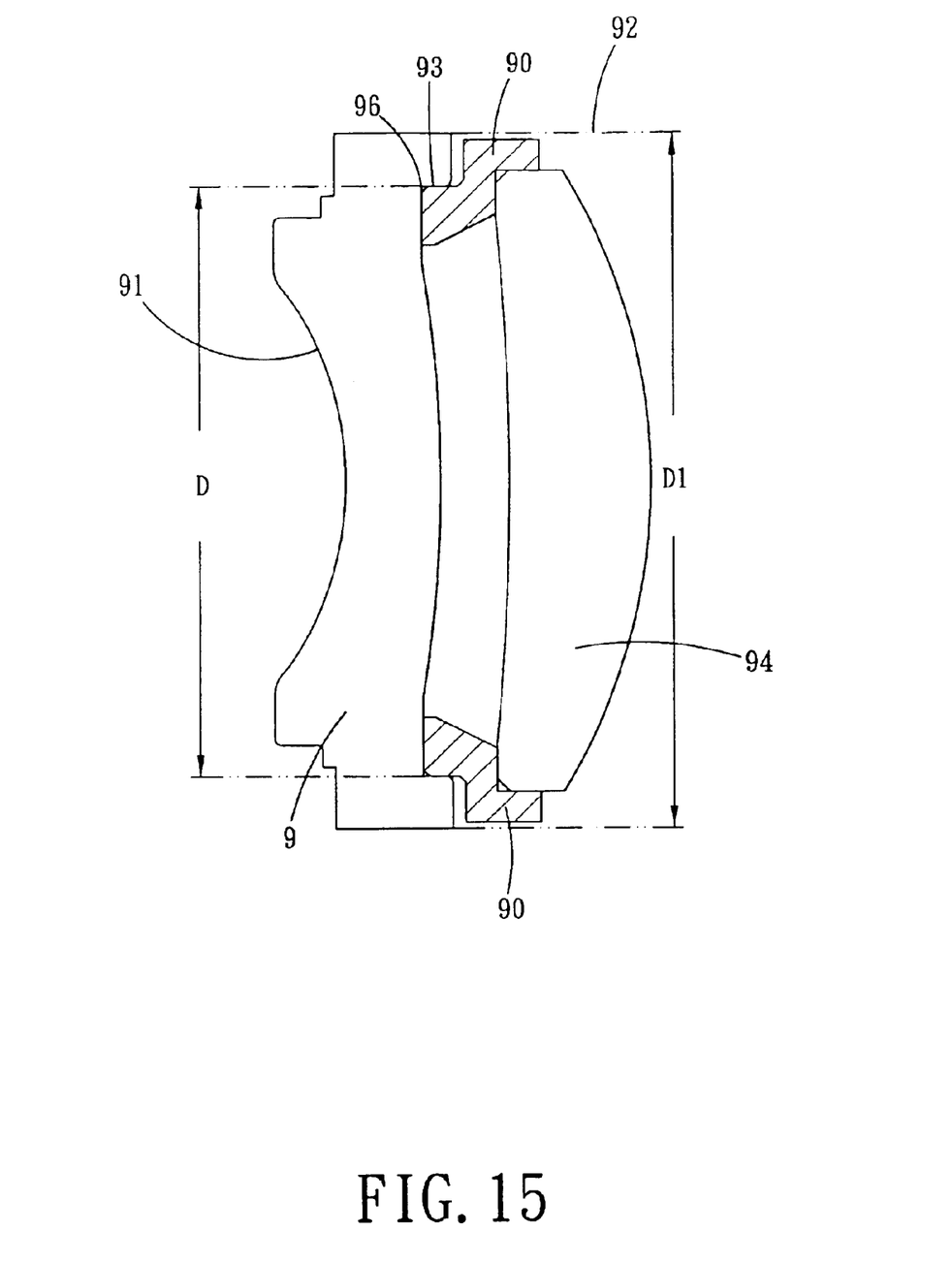

In the twelfth embodiment of the optical system as shown in FIG. 15 and includes a first lens 9, a second lens 94 and the spacer of lens 90. The first lens 9 is a plastic lens and connected to the spacer of lens 90. The lens core 91 of the first lens 9 and the parting line of sleeve 92 are located on the surface of insert 93. The first lens 9 is installed at its maximum diameter. The lens core 91 and the diameter D1 of the parting line of sleeve 92 are larger than the diameter D of the side of insert 93. The second lens 94 is connected to the spacer of lens 90, wherein the outer diameter of the second lens 94 is engaged with an inner diameter of the spacer of lens 90.

Figure 16:
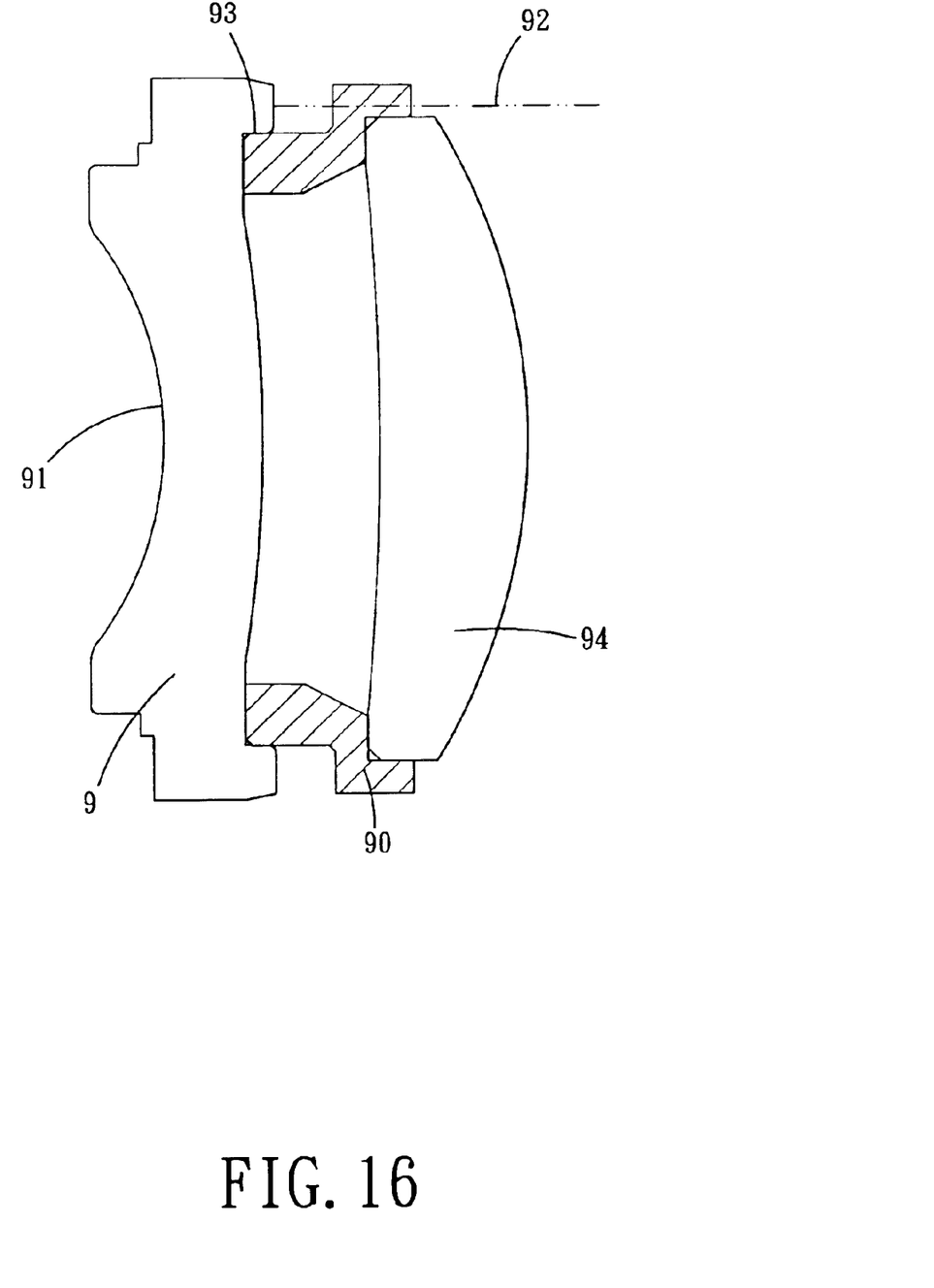

In the thirteenth embodiment of the optical system as shown in FIG. 16 and includes a first lens 9, a second lens 94 and the spacer of lens 90. The first lens 9 is a plastic lens and connected to the spacer of lens 90. The lens core 91 of the first lens 9 and the parting line of sleeve 92 are located at the outer side of the surface of insert 93. The second lens 94 is engaged with the spacer of lens 90, wherein the outer diameter of the second lens 94 is engaged with an inner diameter of the spacer of the lens 90.

Figure 17:
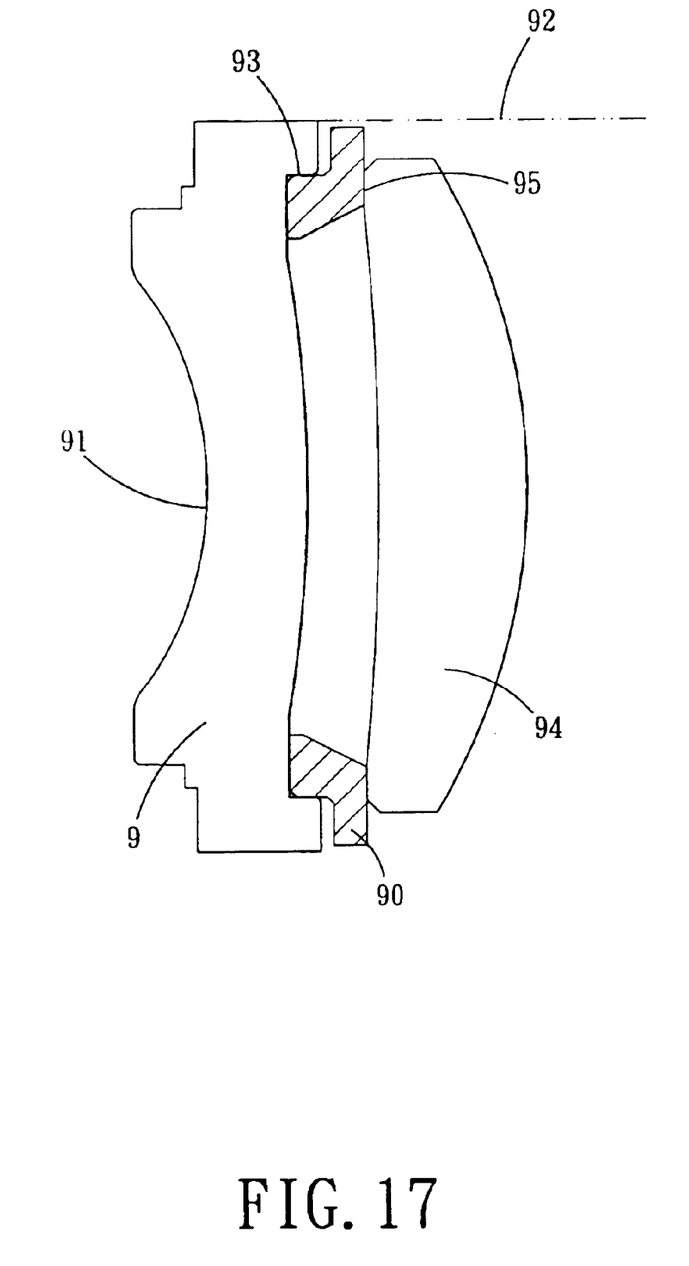

In the fourteenth embodiment of the optical system as shown in FIG. 17, and includes a first lens 9, a second lens 94 and the spacer of lens 90. The first lens 9 is a plastic lens and connected to the spacer of lens 90. The lens core 91 of the first lens 9 and the parting line of sleeve 92 are located at the outer side of the surface of insert 93. The second lens 94 may contact the spacer of lens 90 by the edge 95.

It is to be noted that the present invention may change the position of the parting line of sleeve and the shape of the lenses to match the lenses. The concentric contact plane is located at the inner periphery of the lens core or the sleeve. The vertical contact plane is located at the inner periphery of the lens core or the machining surface of the sleeve. By this way, the shape precision of the mold can be increased and improves the stability of assembling.

While we have shown and described the embodiment in accordance with the present invention, it should be clear to those skilled in the art that further embodiments may be made without departing from the scope of the present invention.

What is claimed is:

1. An optical system comprising:

a first lens being a plastic lens and having a side of insert;

a second lens is a glass lens and having a side of insert which is matched with the side of insert of the first lens, and the diameter D1 of the lens core on the side of insert of a first lens being larger or equal to the diameter D at the side of insert of the second lens;

a surface for controlling a distance between the lenses of the side of insert of the first lens is located between the lens core and an inner side of the parting line of sleeve;

a surface for controlling a distance between the lenses of the side of insert of the first lens contacts a flat surface for controlling a distance between lenses on the side of insert of the second lens.

2. The assembly as claimed in claim 1, wherein a surface for controlling a distance between the lenses of the side of insert contacts the second lens.

3. The assembly as claimed in claim 1, wherein a surface for controlling a distance between the lenses of the side of insert is separated from the second lens by a spacer.

4. The assembly as claimed in claim 3, wherein the thickness of the spacer is less than 0.25 mm.

5. The assembly as claimed in claim 3, wherein the thickness of the spacer is equal to 0.25 mm.

6. The assembly as claimed in claim 1 further comprising a spacer located between the side of inserts of the first lens and the second lens, an inner periphery of the side of insert of the first lens engaged with the spacer.

7. The assembly as claimed in claim 6, wherein the second lens is a glass lens and the diameter D1 of the lens core on the side of insert of the first lens being larger or equal to the diameter D at the side of insert of the second lens.

8. The assembly as claimed in claim 7, wherein an outer periphery of the second lens is engaged with an inner periphery of the spacer.

9. The assembly as claimed in claim 6, wherein the second lens is engaged with the spacer.

\* \* \* \* \*